United States Patent [19]
Hintze et al.

[11] Patent Number: 5,810,520
[45] Date of Patent: Sep. 22, 1998

[54] TOOL FOR MATERIAL-REMOVING MACHINING

[75] Inventors: Wolfgang Hintze, Essen; Andreas Würfels, Köln, both of Germany

[73] Assignee: Widia GmbH, Essen, Germany

[21] Appl. No.: 737,202

[22] PCT Filed: Apr. 12, 1995

[86] PCT No.: PCT/DE95/00515

§ 371 Date: Oct. 30, 1996

§ 102(e) Date: Oct. 30, 1996

[87] PCT Pub. No.: WO95/29782

PCT Pub. Date: Nov. 9, 1995

[30] Foreign Application Priority Data

May 2, 1994 [DE] Germany .......................... 44 15 491.7
Sep. 7, 1994 [DE] Germany .......................... 44 31 796.4

[51] Int. Cl.⁶ .................................................. B23B 27/22
[52] U.S. Cl. ................................... 407/114; 407/116
[58] Field of Search ................................... 407/114, 113, 407/115, 116, 120

[56] References Cited

U.S. PATENT DOCUMENTS

| | | | |
|---|---|---|---|
| 4,859,122 | 8/1989 | Patterson et al. | 407/114 |
| 4,992,008 | 2/1991 | Pano | 407/114 |
| 5,116,167 | 5/1992 | Niebauer | 407/116 X |
| 5,695,303 | 12/1997 | Boianjiu et al. | 407/114 |

FOREIGN PATENT DOCUMENTS

| | | |
|---|---|---|
| 31 05 377 A1 | 10/1982 | Germany . |
| 4118070 | 12/1992 | Germany ................ 407/114 |
| 42 39 235 A1 | 5/1994 | Germany . |
| 1611-583-A | 10/1988 | U.S.S.R. . |
| WO93/11898 | 6/1993 | WIPO . |

OTHER PUBLICATIONS

"Starker, Genauer, Universeller", published in Fertigungstechnik m + w 21/1992.

"Drei Neue in Progarmm" published in Betriebstechnik Nov. 1985.

"Laserschneidmaschine Mit Verfahrbarer Z–Achse" published in VDI–Z 132 (1990) No. 1 Jan.

*Primary Examiner*—A. L. Pitts
*Assistant Examiner*—Henry W. H. Tsai
*Attorney, Agent, or Firm*—Herbert Dubno; Andrew M. Wilford

[57] ABSTRACT

A cutting insert is formed with a cutting edge, a cutting corner at an end of the cutting edge, a cutting surface, and a row of raised scales extending along the cutting edge. Each scale is formed with an arcuate apex line transverse to the cutting edge and forming at the cutting edge relative to a perpendicular to the cutting edge an angle between 55° and –5°, a steep flank to one side of the apex line, and a shallow flank to the other side of the apex line. The apex line is concave toward the other side.

25 Claims, 16 Drawing Sheets

TOOL FOR MATERIAL-REMOVING MACHINING

CROSS REFERENCE TO RELATED APPLICATIONS

This application is the U.S. national phase of PCT application PCT/DE95/00515 filed 12 Apr., 1995 with a claim to the priorities of German applications P 44 15 491.7 and P 44 31 796.4 respectively filed 2 May 1994 and 7 Sep., 1994.

FIELD OF THE INVENTION

The invention relates to a tool for material-removing machining of workpieces, in particular a cutting insert, with a plurality of recessed and/or raised chip-shaping elements which extend along a cutting edge in a row and which are elongated with respective longitudinal axes, the cutting surfaces having at least near the cutting edge a scale-like microstructure and the individual scales being arranged immediately adjacent one another. The invention also relates to a boring tool equipped with the described cutting inserts.

BACKGROUND OF THE INVENTION

Such a tool is for example described in German patent document 4,118,068. There the adjacent chip-shaping elements are arranged at various angles from a maximum of 45° at the cutting-corner regions to 0° relative to perpendiculars to the cutting edge, various travel directions of the chip during the cutting operation being taken into account. Above all only one of the effective chip-shaping elements can be optimally oriented relative to the chip travel direction. The other chip-shaping elements not properly positioned relative to the chip-travel direction create material deposits and substantial friction to a degree dependent on the variation of the orientation of the chip-forming element from the actual chip-travel direction. This is also true for a tool according to German patent document 4,118,070 whose chip-shaping elements are arranged parallel to one another along the cutting edge.

German patent document 3,105,377 describes a cutting insert whose cutting surface has a plurality of spaced, adjacent, and upstanding projections or recesses, the spaces between the projections or in the cutting surface holding at least one row of generally semicircular or kidney-shaped recesses extending parallel to the cutting edge and only slightly spaced from each other. The longitudinal axes of the recesses of the row are parallel to the respective cutting edge. A chip moving here thus undergoes extreme frictional resistance which also leads to depositing of workpiece material and material adhesions and/or high cutting temperatures. The same is for true tongue-like projections extending from the cutting-surface plateau toward the cutting edge according to U.S. Pat. No. 5,265,985.

OBJECT OF THE INVENTION

In workpieces for material-removing machining, in particular for turning, milling, or boring, which are used with little or no coolant and by means of which soft or highly alloyed or hardened or laminated workpieces are machined, it is an object to reduce as much as possible the local friction with different chip cross sections, that is with different chip-travel directions and/or curvatures in order to reduce or eliminate detrimental workpiece adhesions or bonding to the cutting surface.

SUMMARY OF THE INVENTION

This object is solved by a tool having at least near the cutting edge a scale-like microstructure and the individual scales are arranged immediately adjacent one another and each have parallel to the cutting edge a section which has a steep flank and a shallow flank, and the apex lines of the scales extend at different angles and/or curvatures. The flat(ter) flank is on the side of the apex line toward the center of curvature. In this manner with any cutting width of the chip passing over the contact zone the angle of the apex lines of the scales is greater than or equal to the respective span-travel angle and/or the curvature of the apex lines is equal to or greater than the respective lateral chip curvature. The flank angles reduces the chip contact substantially on the flat flank near the apex line, so that if necessary the chip can slide unhindered over the apex lines. In particular with indexable cutting plates for turning and for corner milling the apex lines of the scales are curved and arranged at different angles. In cutting inserts that are used for boring, the curvature of the apex lines is more important than the orientation of the scales at various angles. The apex lines of the scales form relative to the cutting edge with a perpendicular to the cutting edge on the cutting surface an angle between 55° and 5°.

Thus preferably the apex lines for turning and milling cutting inserts are directed away from the cutting corner or for boring cutting inserts the curvatures are directed at the drill axis so that they follow the path of actual chip-travel direction. Preferably the curvatures from the cutting corner to the cutting-edge center or to the next cutting corner or from the effective cutting corner to the adjacent cutting-edge corner are so shaped that with turning or milling tools they have increasing radii and by boring tools (due to the differently oriented chip travel direction) decreasing radii from cutting corner to cutting corner. The curvature of the apex line of an individual scale is preferably constant over its length, lying according to a particular embodiment of the invention between 0.1 mm and 12 mm near a cutting corner to 2 mm to 60 mm increasing at the cutting-edge center, with increasing spacing from the effective cutting-edge corner. This is true for a substantial part of the actual scales.

According to the cutting operation the maximum height of the scales measured as a spacing of the apex line from the foot point of a flank lies between 0.01 mm and 0.25 mm, preferably between 0.025 mm and 0.1 mm.

To better guide the chip the height of the scales increases with increasing distance form the cutting edge.

The apex lines of the scales or their tangents extend at a cutting angle of −10° to +30° and/or form with respective perpendiculars to the cutting edge from the cutting corner to the cutting-edge center a decreasing angle of 55° to −5°.

According to a further embodiment of the invention the length of the scales increases from the cutting corner to the cutting-edge center or to the next cutting corner along a cutting edge in regions or steadily, lying preferably between 0.15 mm and 8 mm. The flanks of the scales are in section straight, rounded, or concave, preferably with radii of curvature >0.1 mm for steep flanks and >1.5 mm for flat flanks. The flanks of the scales or their tangents extend relative to the cutting edge on the side turned away from the center of curvature of the apex lines under a steeper angle of 45°±30° and on the other side under a flatter angle <15°. The transitions between adjacent flanks of the scales at the apex lines is sharp or rounded.

In particular with polygonal cutting inserts with multiple cutting corners, in particular with left- and right-cutting indexable cutting inserts according to the invention in the region of the cutting corners there is a scale extending in the direction of an angle bisector and having an apex with in cross section perpendicular to the angle bisector at least the same height as the apex lines of adjacent scales and whose flank angle (in contrast to the adjacent scales) is the same, the apex angle, that is the angle formed by the flanks, being 130° to 175°, preferably 150° to 170°. The apex angle of the scale decreases with increasing spacing from the cutting edge either in parts steadily or suddenly.

The scales can extend right to the cutting edge or run out at the cutting edge, the scale height dropping to 0 mm. Alternatively it is also possible between the cutting edge and the scales for there to be a land or a chip-shaping inlet, if necessary the scales forming part of the chip-forming inlet or merging therewith. The scales can be arranged at a land.

Preferably tools for turning are formed with a positive or neutral free angle, with a one- or two-sided construction, straight or curved edges or as a (rectangular) milling plate.

The number of scales lies between 3 and 30, preferably 10 through 25, with the scales at least in the region of the effective cutting edge, that is in the chip-engaged region.

The above-described invention principles can also be realized with cutting inserts having a raised central surface, a so-called cutting surface plateau. This cutting-surface plateau, that projects past the cutting edge plane or through a chip-shaping plane formed by the apex lines, has preferably in the region closer to the cutting edge roof-like scales which are formed in accordance with the above-described scales, preferably differing therefrom by shorter length.

As a result of the above-discussed construction a milling tool is produced that with any cutting width in the chip contact zone the angle of the apex lines of the scales is greater than or equal to the actual chip-travel angle and/or the curvatures of the apex lines is greater than or equal to the actual lateral chip curvature. In connection with the flank inclinations the chip contact is largely reduced woo the flat flank near the apex, if necessary the chip can slide unhindered over the apex lines. In particular when corner milling the apex lines of the scales are curved and at different angles.

In order to optimize the known milling tool with respect to the cutting-corner construction of the planing cutter, that is in order to reduce as much as possible the local friction with different chip sections so that deleterious material adhesions and depositions are reduced or prevented on the cutting surface, near a cutting corner or near a planing edge there is at least one scale with the same curvature direction as the scales on the main cutting edge and having a curvature directed away from the cutting corner. As a result of this formation of the planing cutter sections near the cutting corner the chip shaping is also improved in this region. This means with multiple-edged workpieces that with right-cutting milling plates the above-described scale formation is provided at one cutting corner, preferably in the region of the actively cutting edge of the cutting surface. In the back regions of the same cutting edge which is used as a planing cutter after turning of the indexable cutting plate in the tool holder there is at least one scale which relative to the scales at the farthest cutting corner has a different shape. This scale has the same curvature direction as the scales as those of the adjacent cutting corner of the main blade whose curvatures are directed away from the cutting corner.

Preferably the radius of curvature of the scale(s) on the planing edge is the same as or bigger than the radii of curvature of the scales which are near the cutting edge of the main cutting edge.

The angle formed between the end of the scale and a perpendicular from the main cutting edge toward the planing edge is equal to or bigger than the corresponding angle of the scales which are near the cutting edge of the main cutting edge. The scale closest to the cutting corner or individual scales on the planing edge end at a spacing or terminate near the cutting edge at a spacing of two verticals which are determined on the one hand by the known scale end near the plane-cutting edge perpendicular to the plane cutting edge and on the other hand by the contact point of the planing edge and the cutting edge perpendicular to the plane cutting edge. The spacing of these verticals is in the range of the minimal tooth advance which is determined by the advance in millimeters per revolution divided by the number of cutting edges and the product of the maximum number of teeth and the maximum tooth advance. This spacing lies preferably between 0.03 mm and 4 mm. The scale or scales on the planing edge end at a spacing from the planing edge which is equal to one to four times the planing error, preferably in the range 0.01 mm and 0.5 mm.

In particular the above-described cutting inserts are used in boring tools of the type described in claim 26. Such boring tools are described in principle in German patent document 4,018,043. Within the scope of the present invention these boring tools have cutting inserts of the type described in claims 1 through 20 with the feature that the radii of curvature of the apex lines of these cutting inserts are directed at the drilling axis, preferably from the cutting corner radially to the adjacent cutting corner and getting smaller toward the drilling axis.

BRIEF DESCRIPTION OF THE DRAWING

Embodiments of the tool according to the invention are described below with reference to the drawings. Therein.

SPECIFIC DESCRIPTION

Figure 3:
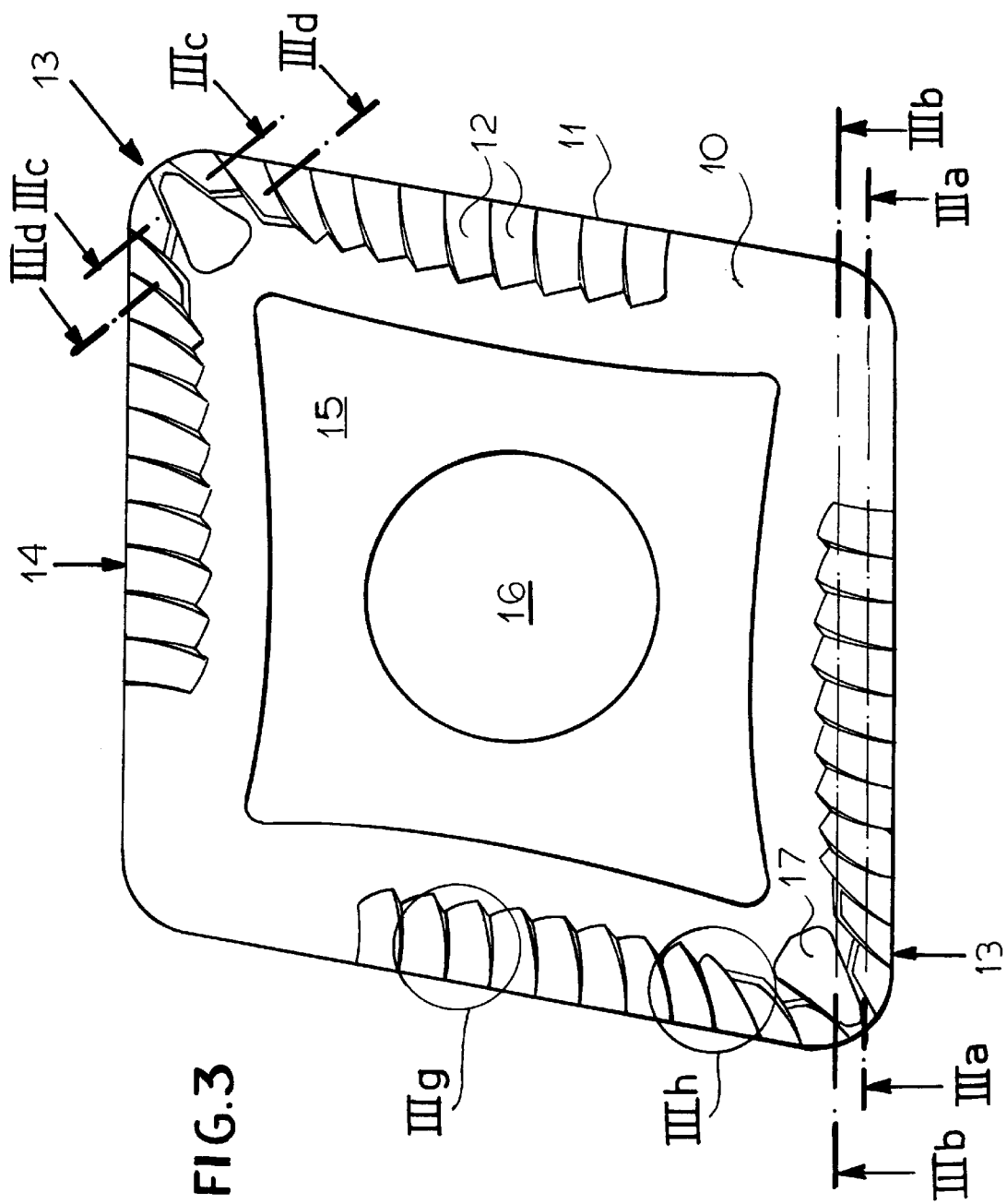
FIG. 3 is a top view of a tool according to the invention.
Figure 3A:
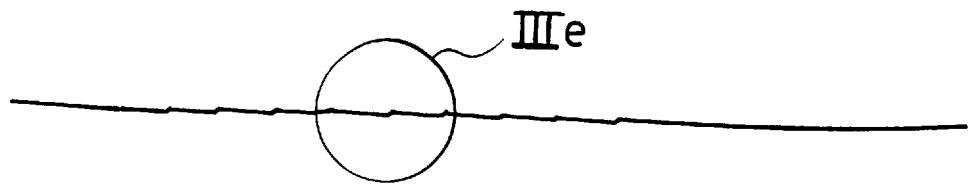
FIGS. 3a, 3b, 3c, and 3d are sections taken along respective lines IIIa—IIIa, IIIb—IIIb, IIIc—IIIc, and IIId—IIId of FIG. 3.
Figure 3B:
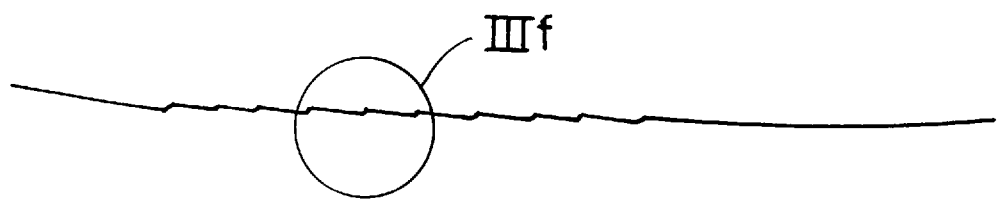
Figure 3C:
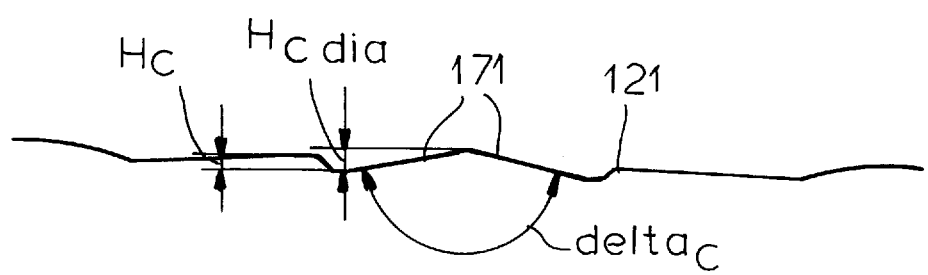
Figure 3D:
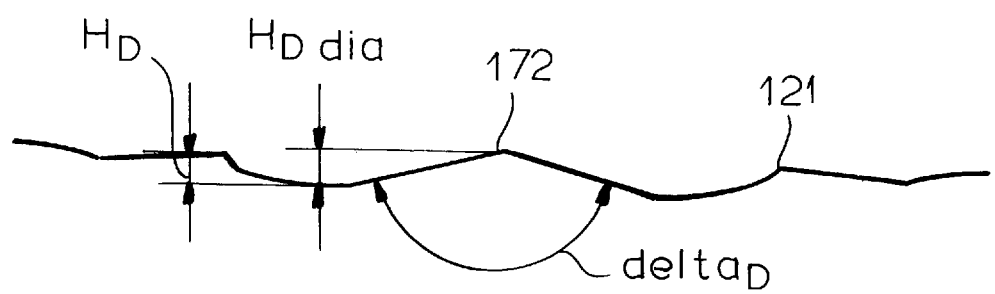

As seen in particular in FIGS. 3a–3h as well as in FIGS. 5b, 6b, 7b, and 8b the cutting plate according to the invention has on its cutting surface 10 along the cutting edge 11 individual adjacent scales 12 which are elongated with longitudinal axes that extend at various angles inward from the effective cutting corner 13 to the cutting-edge center 14 relative to the cutting edge. Relative to a respective perpendicular to the cutting edge the angles nearer the cutting corner are larger and become smaller toward the cutting-edge center, becoming if desired 0 or negative. In addition to the various angular positions the scales 12 are also formed so that their flanks are curved arcuately seen from the cutting corner along their longitudinal direction. Each scale 12 can have different curvatures along the longitudinal direction at different locations or can be of constant curvature over the entire length. In the case of FIGS. 3a–3h the curvature increases toward the regions remote from the cutting corner. The cutting insert can have as shown in FIG. 3 a central plateau 15 or a central recess. The cutting insert can be made with or without a mounting hole 16.

FIGS. 1, 3a, 3e, and 3f show scales that have an apex point 121 forming a border between a steep flank 122 and a shallow flank 123, the steeper flank 122 lying on the side turned away from the center of curvature of the apex line.

Figure 3E:
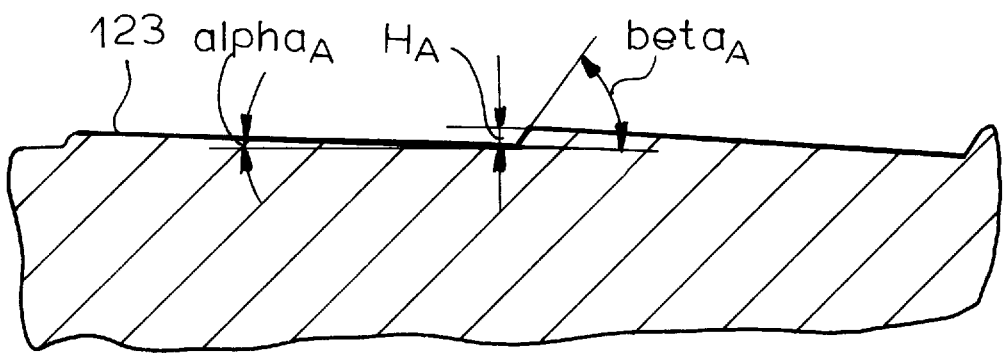
FIGS. 3e and 3f are large-scale sectional views of the details indicated at respective circles IIIe and IIIf of FIGS. 3a and 3b, respectively.
Figure 3F:
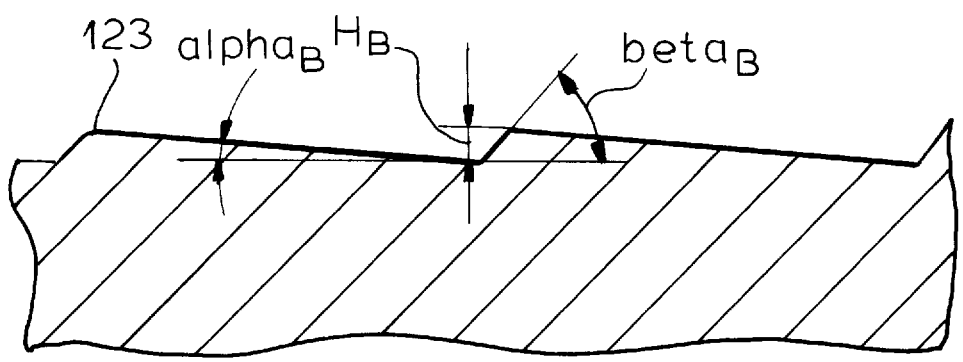

The flanks can be formed either planar or slightly convex or concave (thus part spherical). Similarly the apex line 121 can be sharp-edged or rounded; the same is true for the transitions 124 from the flatter flanks 123 to the steeper flanks 122. Finally the two enlarged sectional views of FIGS. 3e and 3f show that the flanks can have in the regions close to the cutting edge different angles from in the regions remote from the cutting edge. In this case the angle α of the flatter flank 123 increases away from the cutting edge while the angle β of the steeper flank 122 remains generally the same. In each case the angle β is larger along the entire length of the respective scale.

In the embodiment of FIGS. 3a–3h the individual scales 12 have a greater height away from the cutting edge, that is a larger spacing of the apex line 121 from the foot point 124 (see heights $H_A$ and $H_B$ in FIGS. 3e and 3f.

In addition the cutting insert has in the cutting corner 13 a raised chipping element formed mirror symmetrical relative to a respective angle bisector, so that the respective scale 17 widens conically toward the center of the cutting surface. The scale 17 which is shown along section lines IIIc—IIIc and IIId—IIId of FIG. 3 in FIGS. 3c and 3d has two symmetrical flanks 171 which form an angle between 150° and 170°. This angle is smaller close to the cutting edge than remote therefrom. The apex line 172 in every case is above the apex lines 121 of adjacent scales 12. The cutting insert according to FIG. 3 has along each cutting edge eleven scales 12 which extend from the cutting corner 13 along the cutting edge 14.

Figure 1:
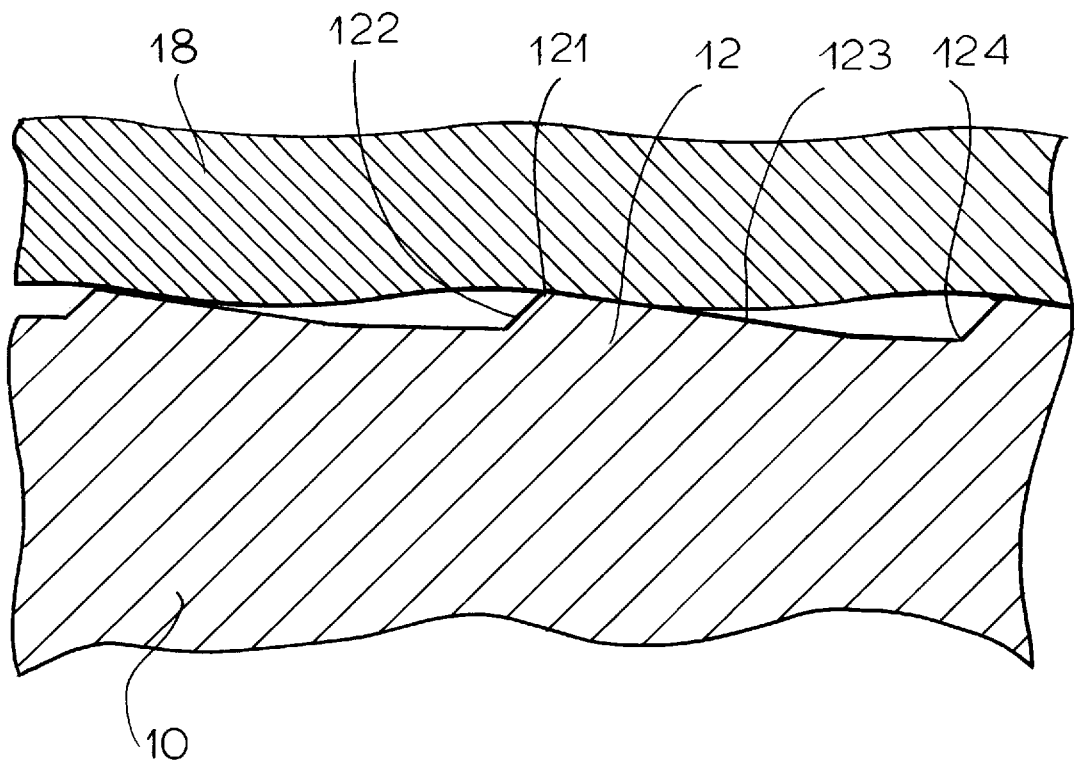
FIG. 1 is the chip movement with the cutting insert according to the invention.
Figure 2:
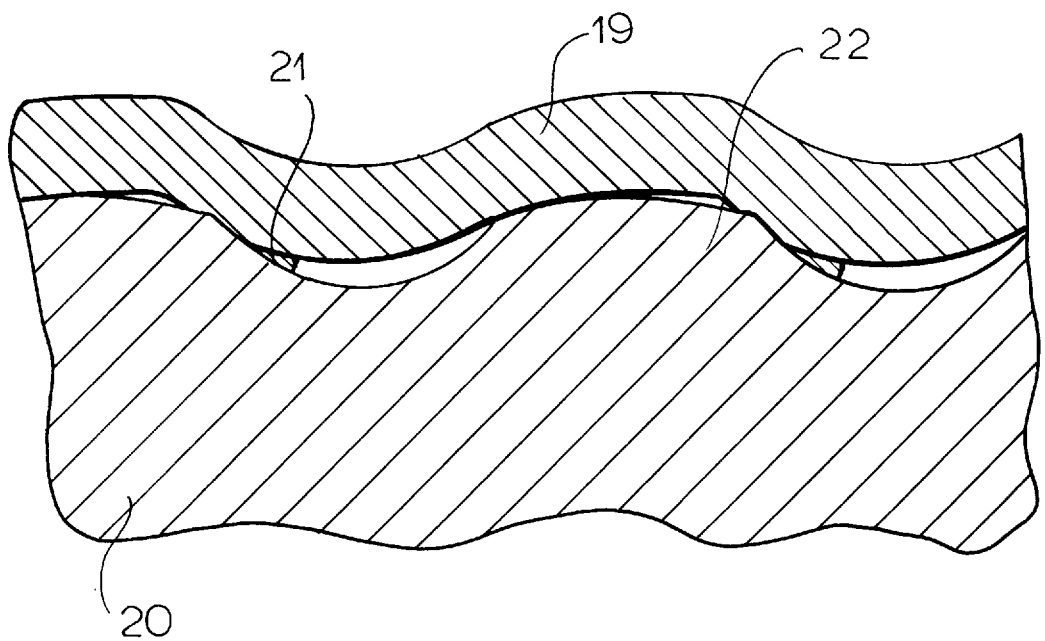
FIG. 2 is the chip movement with a cutting insert according to the prior art during a cutting operation similar to that of the tool of FIG. 1.

The action of the cutting insert according to the invention is clearly shown in FIG. 1. The passing chip 18 is gently guided over the flatly extending flank 123 so that it does not contact the sharp-edge steep flank. In contrast thereto in the cutting insert 20 of the prior art, which has longitudinal ribs extending at various angles to the cutting edge, the passing chip 19 must overcome considerable friction which can lead to workpiece adhesions or deposits 21 (FIG. 2). This is true since, even in an embodiment where the longitudinal ribs have different directions relative to the cutting edge, only one longitudinal rib extends in the chip-travel direction while all the remaining ribs 22 impart movement components to the passing chip 21 which are transverse to the longitudinal direction of the respective ribs.

Figure 3G:
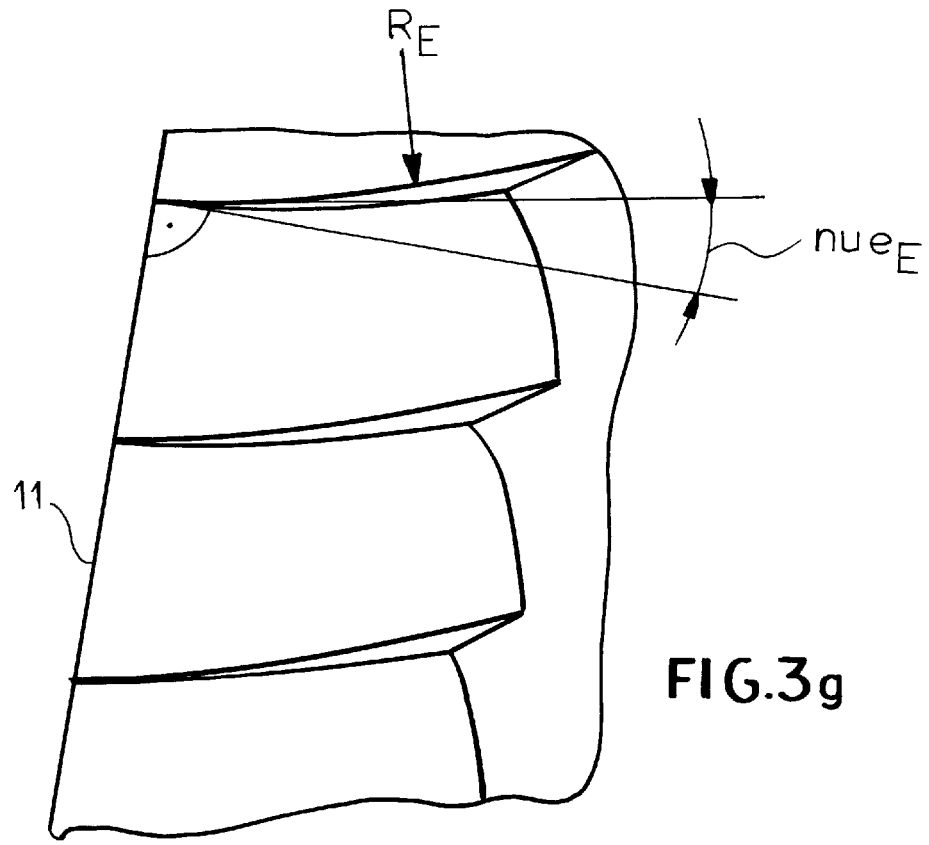
FIGS. 3g and 3h are large-scale views of the details of the cutting edges as indicated at respective circles IIIg and IIIh of FIG. 3.
Figure 3H:
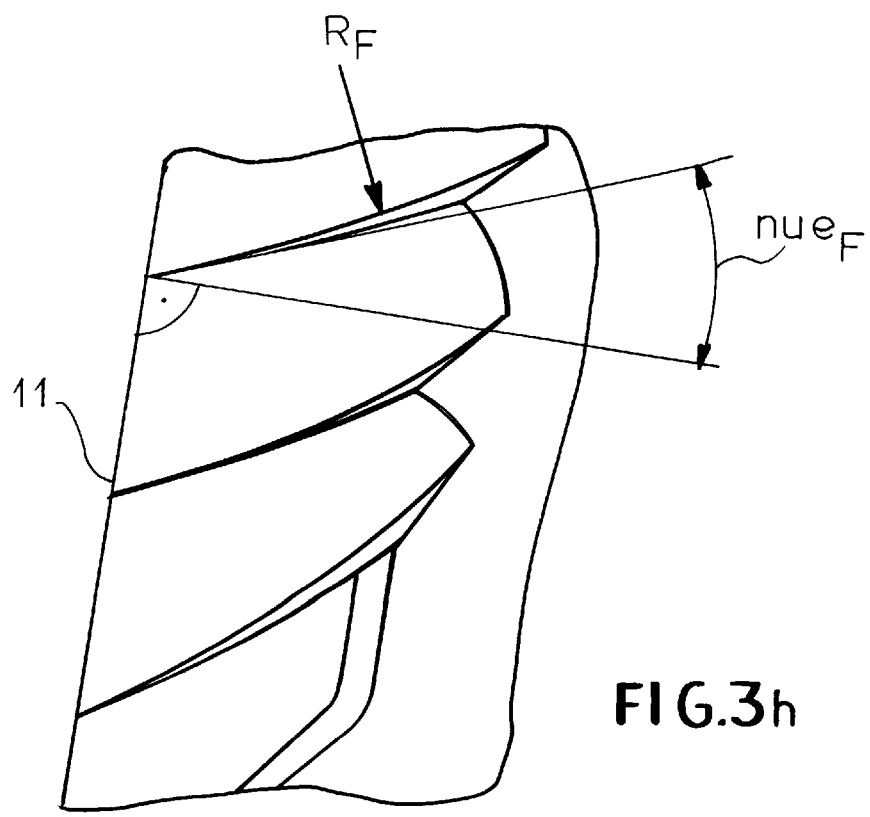

As in particular shown in FIGS. 3g and 3h, the curvatures of the apex lines 121 point in the same direction while they decrease from the cutting corners to the cutting-edge center. With a presumed part-circular formation the radii of curvature go from 0.1 to 12 mm at the cutting corner 12 to 2 through 60 mm in the cutter center. This is true for turning and milling tools. For the cutting insert according to FIG. 3 the corresponding radius change shown in FIG. 3g, which shows the detail E, is clearly shown in comparison to FIG. 3h, which shows the detail F. The changing radius of curvature decreases with the angle nue from the region close to the cutting corner to the region remote from the cutting corner.

Figure 4A:
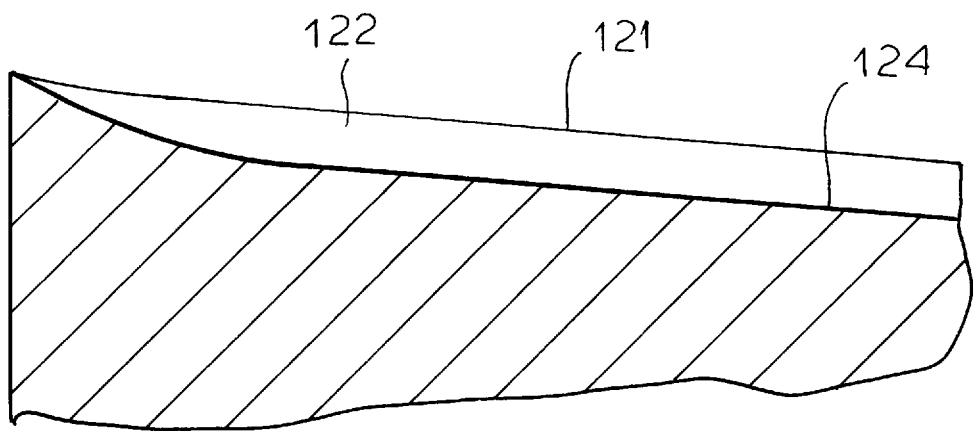
FIGS. 4a through 4f are partial sections through the cutting edges of tools according to the invention.
Figure 4B:
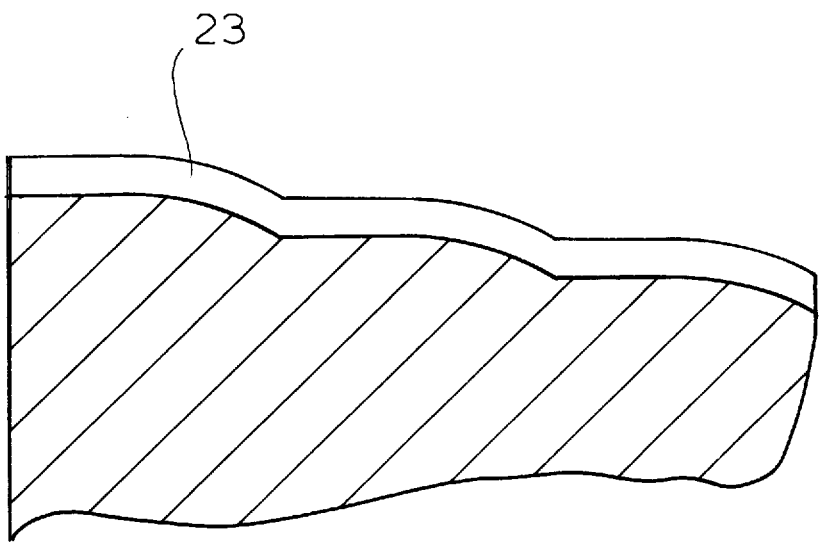

FIG. 4a shows a section taken vertically to the cutting edge where the flank 122, the apex line 121, and the transition line from the flank 122 to the adjacent flank 123, the line 124, is visible. With the embodiment according to FIG. 4a the scales 12 reach right to the cutting edge and form the chip-guiding inlet. With the embodiments according to FIGS. 4b and 4d the scales 23 and 24 extend to the cutting edge with the scales 23 being formed arcuate perpendicular to the cutting edge and forming individual steps or inflection points. The cutting surface plane is recessed with increasing spacing form the cutting edge. The travel of the scales 24 according to FIG. 4d is linear and descending, that is at a constant cutting angle relative to the free surface.

Figure 4C:
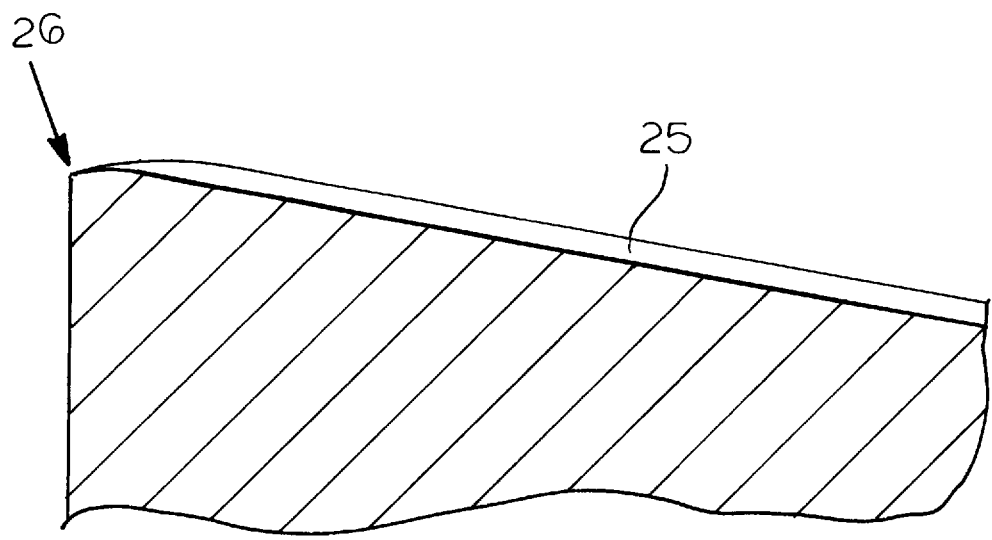
Figure 4D:
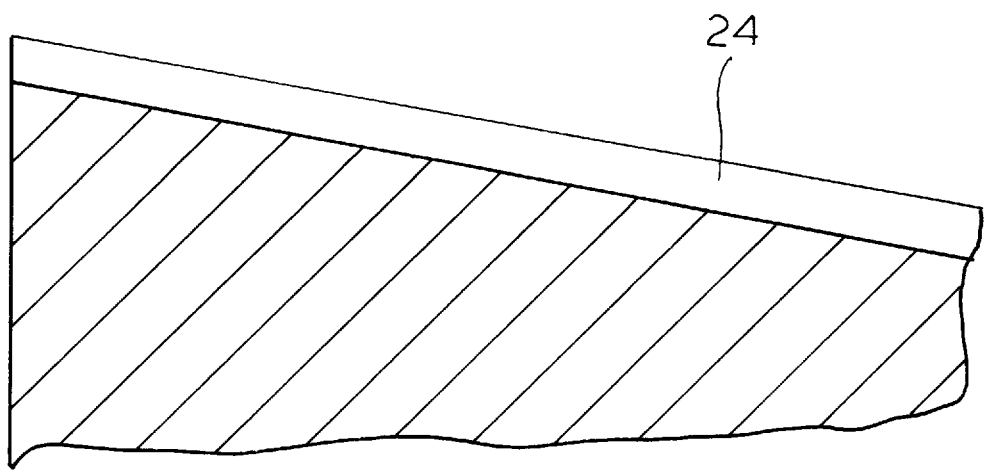
Figure 4E:
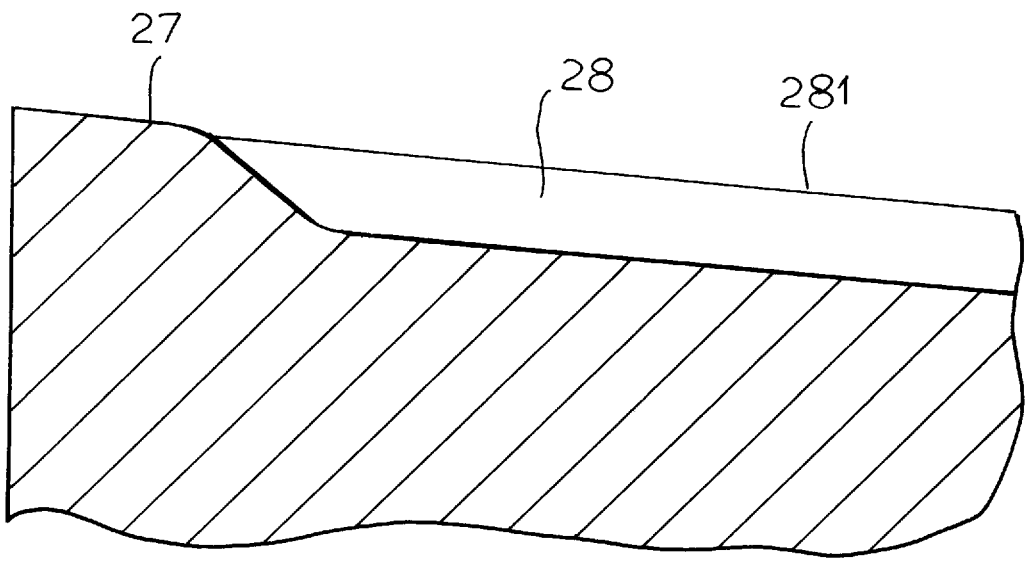
Figure 4F:
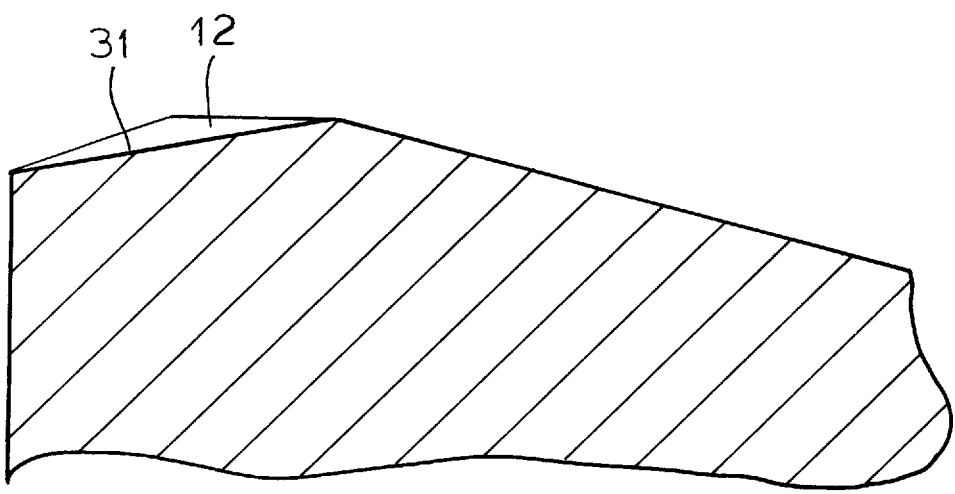

With the embodiment according to FIG. 4c the scales 25 are constructed such that they end at the cutting edge 26, that is their height is reduced to 0. The cutting surface at first rises from the cutting edge 26 but then drops linearly in regions remote from the cutting edge. The cutting insert according to FIG. 4e has a land 27 adjacent which the scale formation 28 is formed. The scale apex line 281 lies slightly below the plane of the land 27. FIG. 4f shows a cutting insert where the scales 12 lie in the region of a land 31. The cutting insert shown in FIG. 4f is made of a very hard material and is intended for machining extremely hard workpieces.

Figure 5A:
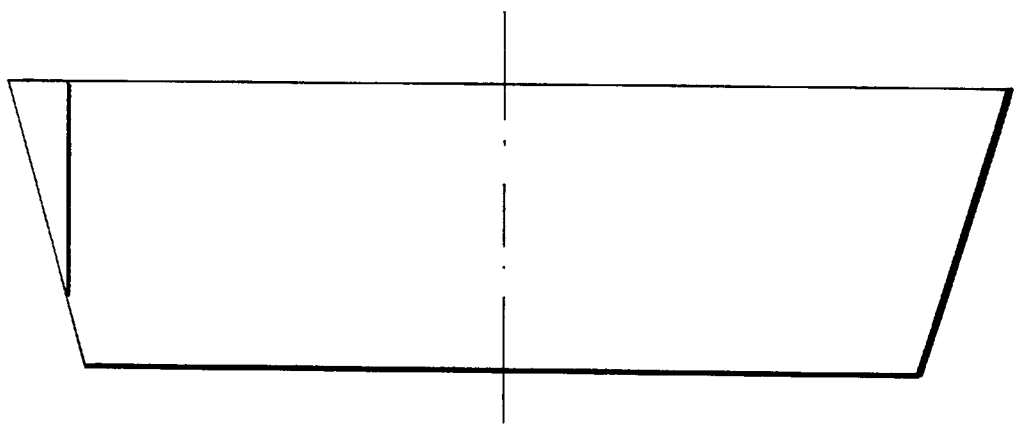
FIGS. 5a and 5b are side and top views of an indexable milling cutting plate according to the invention.
Figure 5B:
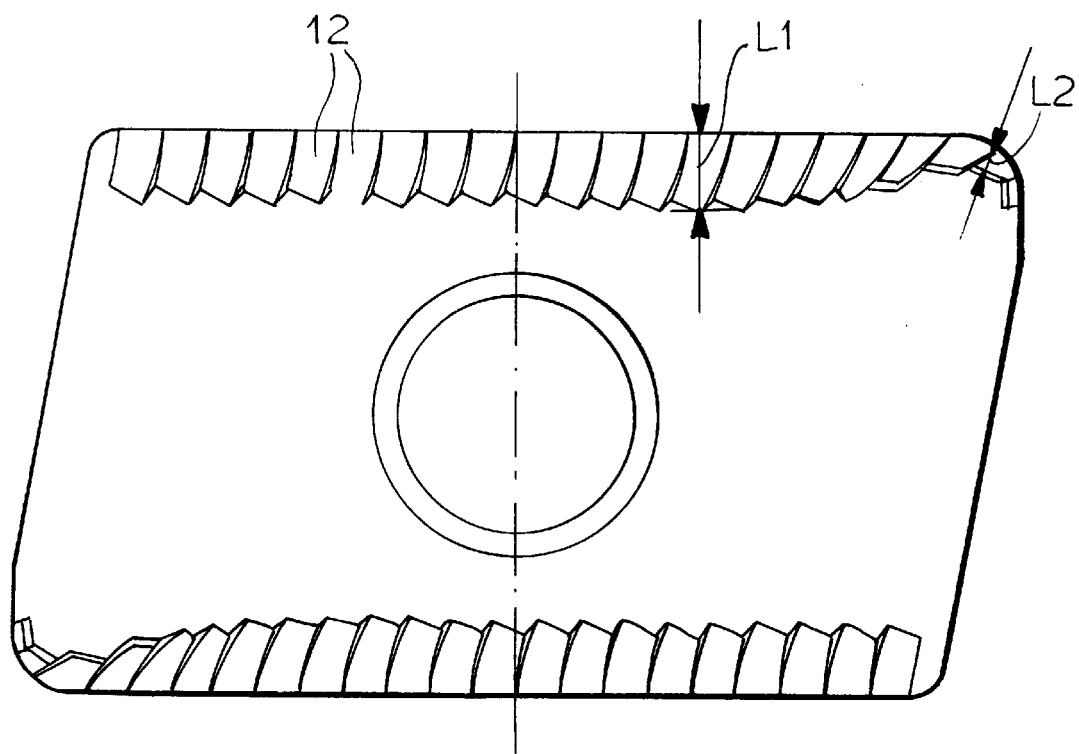
Figure 7A:
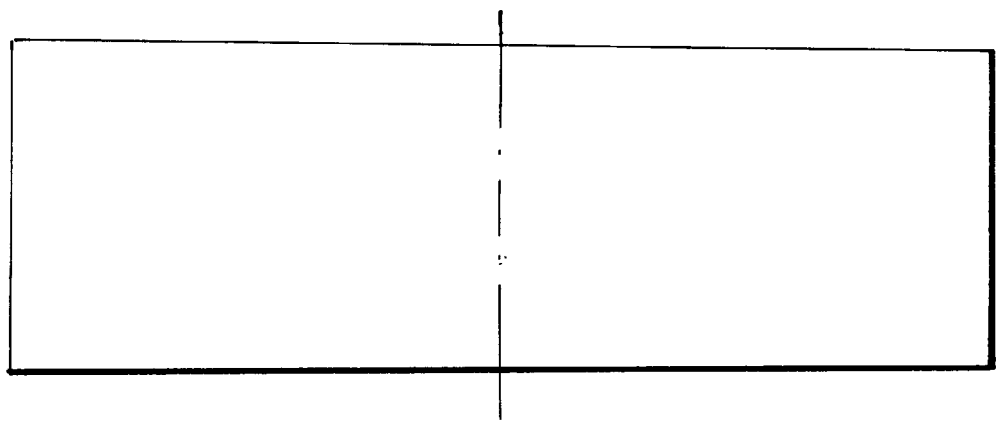
Figure 7B:
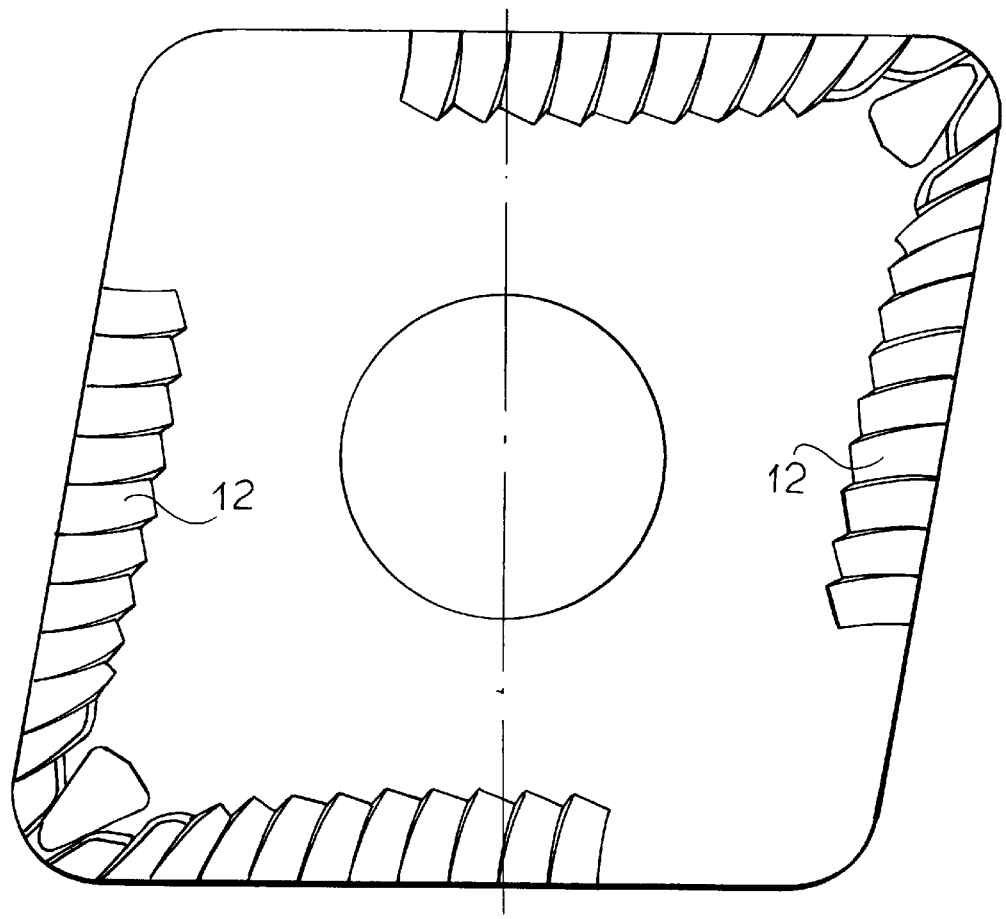
Figure 8A:
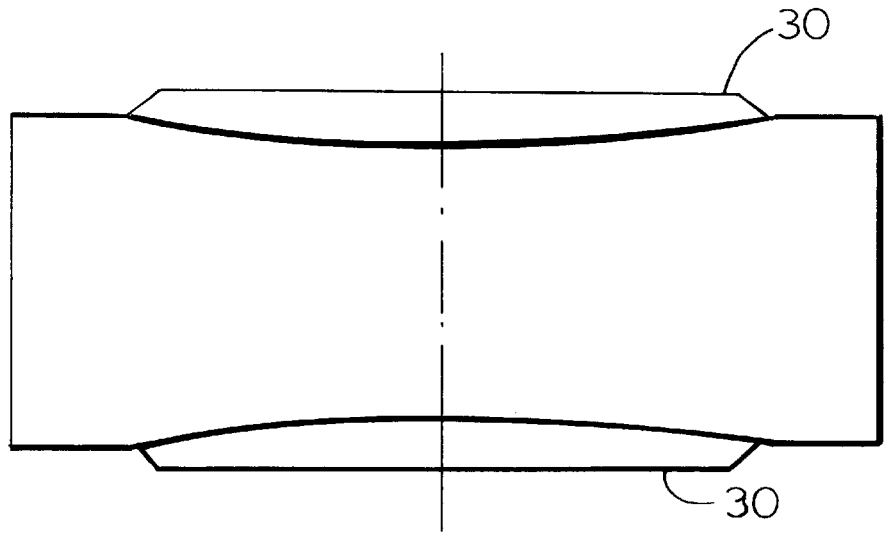
Figure 8B:
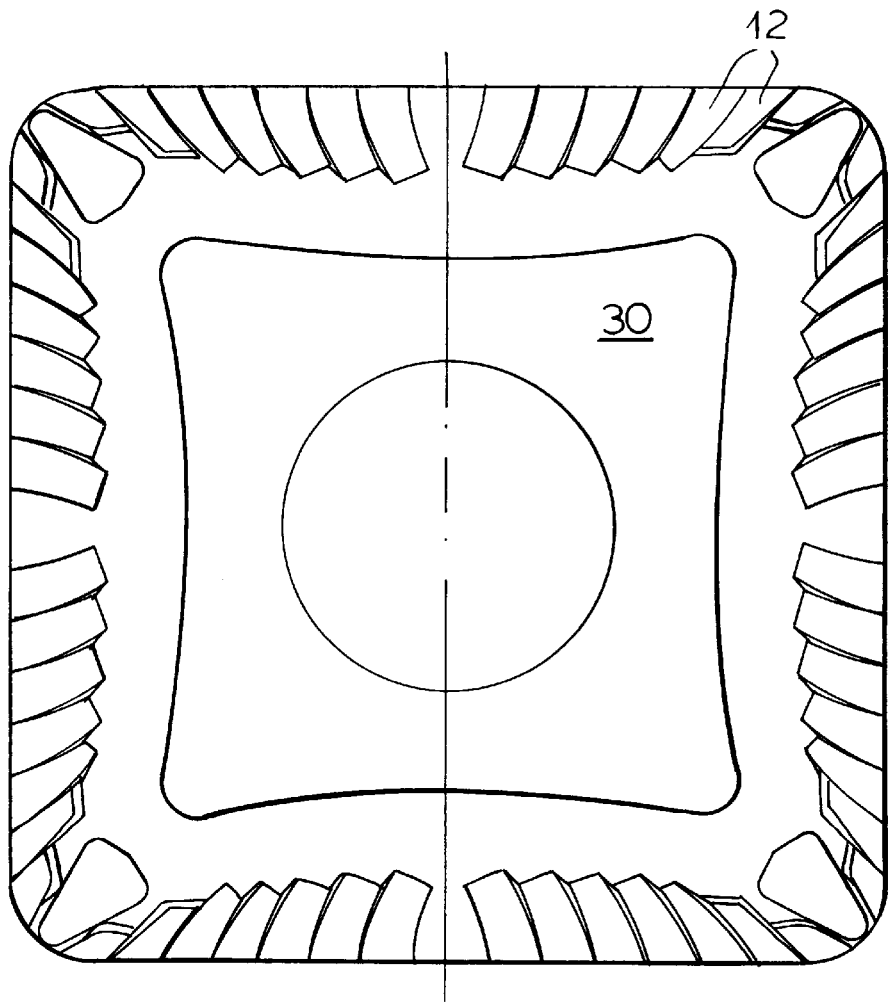

FIG. 5 shows an indexable milling cutting plate and FIGS. 6 through 8 shows indexable cutting plates for turning.

The indexable cutting plate according to FIG. 5 has a generally rhombic shape seen in top view with scales extending along the cutting edges extending from the sharp corners and having in the cutting corner a length $L_2$ which increases to a greater length $L_1$ and remains constant when spaced about a third of the way along the cutting edge from the effective cutting corner. Otherwise the scales according to FIG. 5 are formed like those of FIGS. 2 and 3.

Figure 6A:
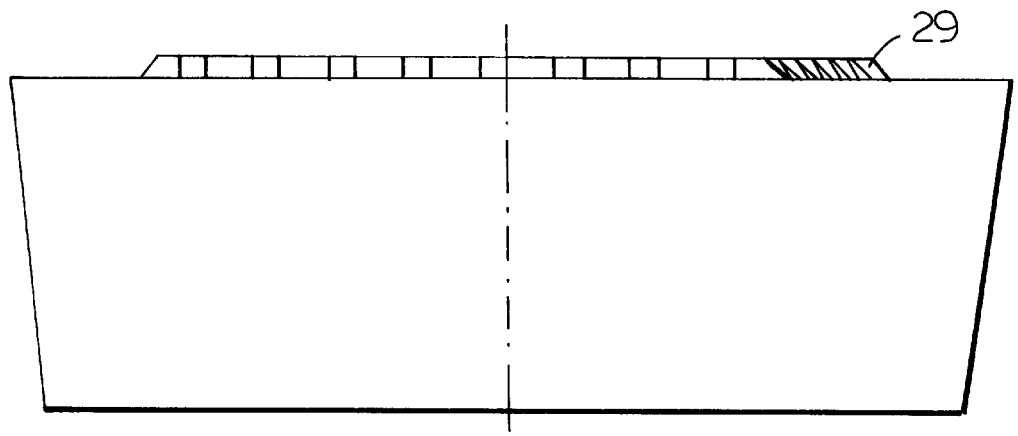
FIGS. 6a and 6b, 7a and 7b, and 8a and 8b are side and top views of further indexable milling cutting plates according to the invention.
Figure 6B:
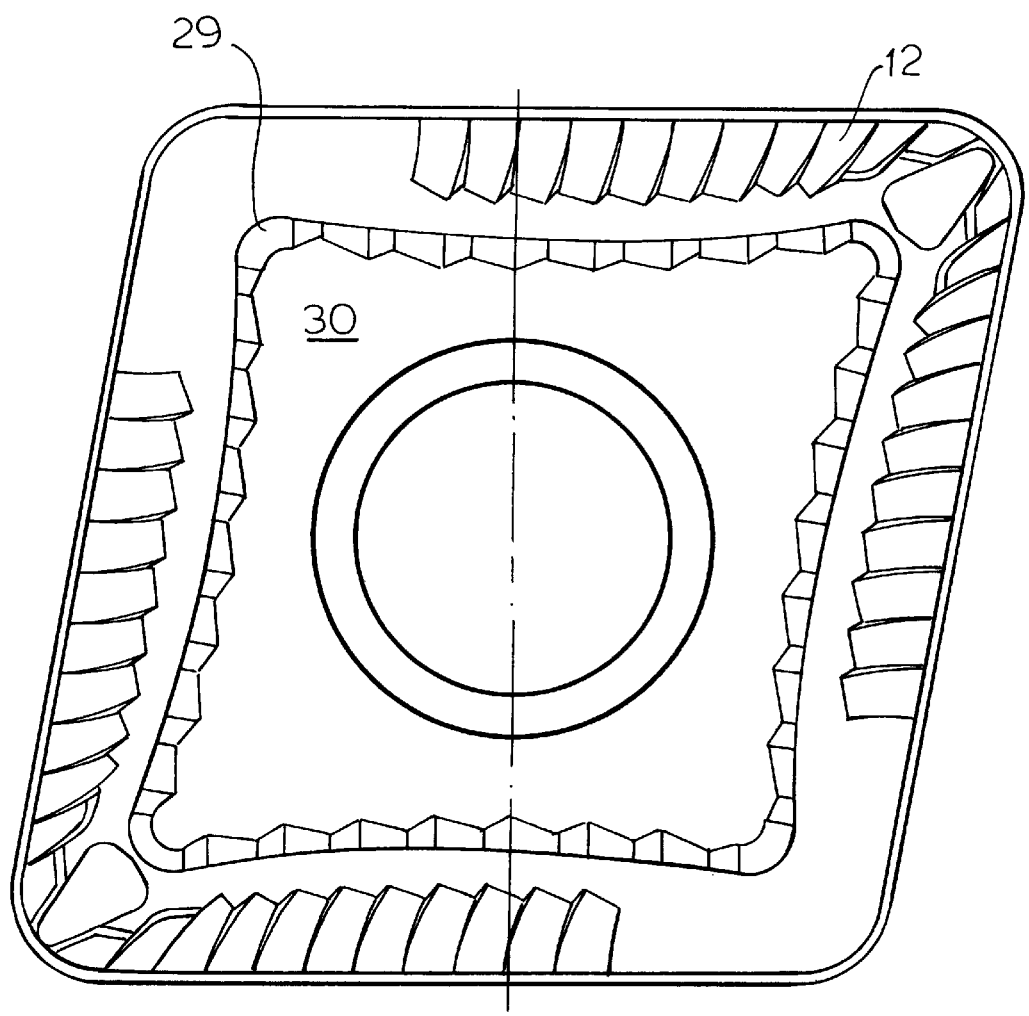

The indexable cutting plate according to FIG. 6 is also rhombic and has four cutting edges of the same length. To each side of a cutting corner which forms an acute angle there is a row of scales which extends past the respective cutting-edge center as also described with reference to the embodiment of FIG. 3. In addition the cutting insert has further scales 29 on the central cutting-surface plateau 30. These scales 29 have however a substantially shorter length than the scales 12 at the cutting edge or a land there. As shown in FIG. 6a the free angle of the cutting plate according to the invention can be positive or 0° corresponding to FIG. 7a.

The indexable cutting plate according to FIG. 8 is square and has a free angle of 0°.

Figure 9A:
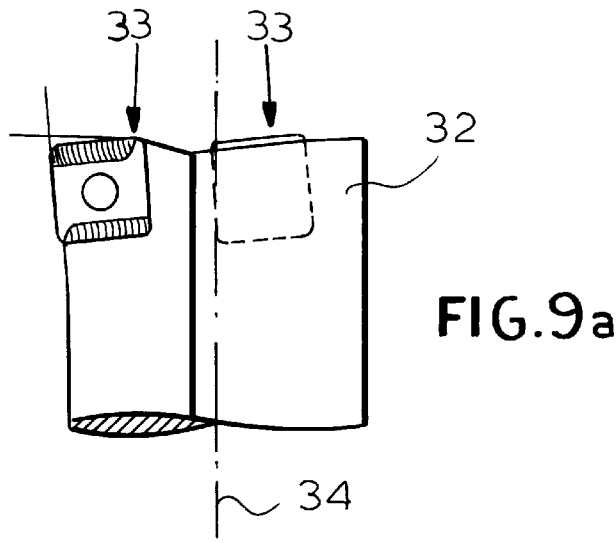
FIGS. 9a, 9b, and 9c are front side, end, and back side views of a boring tool fitted with two cutting inserts.
Figure 9B:
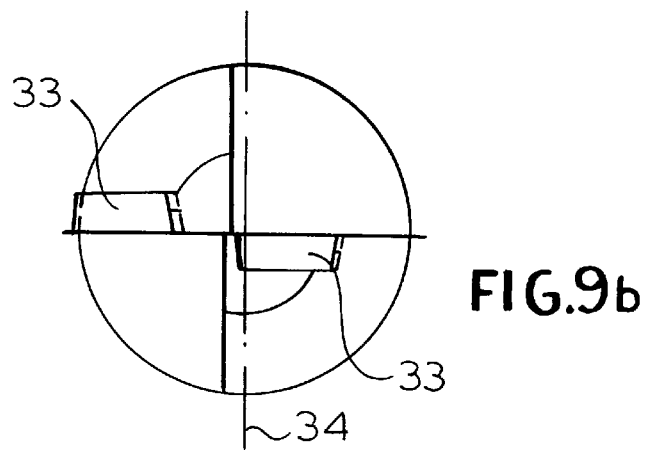
Figure 9C:
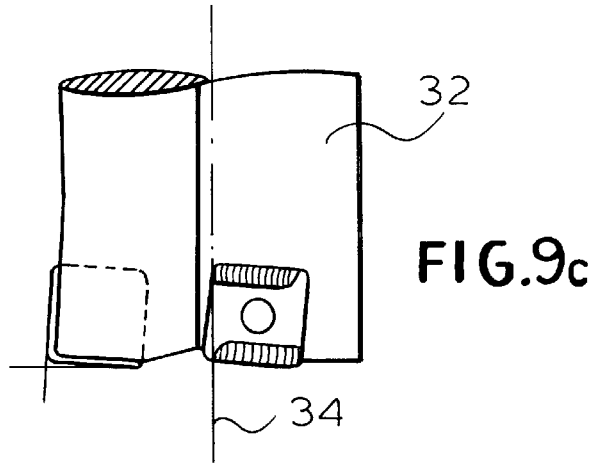

FIG. 9a shows a right-turning boring tool in a top view of the outer cutter, FIG. 9b shows this boring tool in an end top view, and FIG. 9c shows a right-turning boring tool in top view on the inner cutter. Boring tools of this type are used for boring in solid metal and have a shaft 32 and several, here two, similar cutting inserts 33 mounted on the end of the shaft at various radial spacings and 180° offset from each other, with their working regions overlapping and with the radially inner indexable cutting plate with its engaged cutting edge extending somewhat past the bit axis 34. Such a bit is described for example in German patent document 4,018, 043 to which specific reference is made. Instead of the cutting inserts described there with two adjacent cutting edges inclined at an obtuse angle to each other it is possible as shown in FIGS. 9a and 9c to use rectangular or rhombic cutting inserts.

Figure 10:
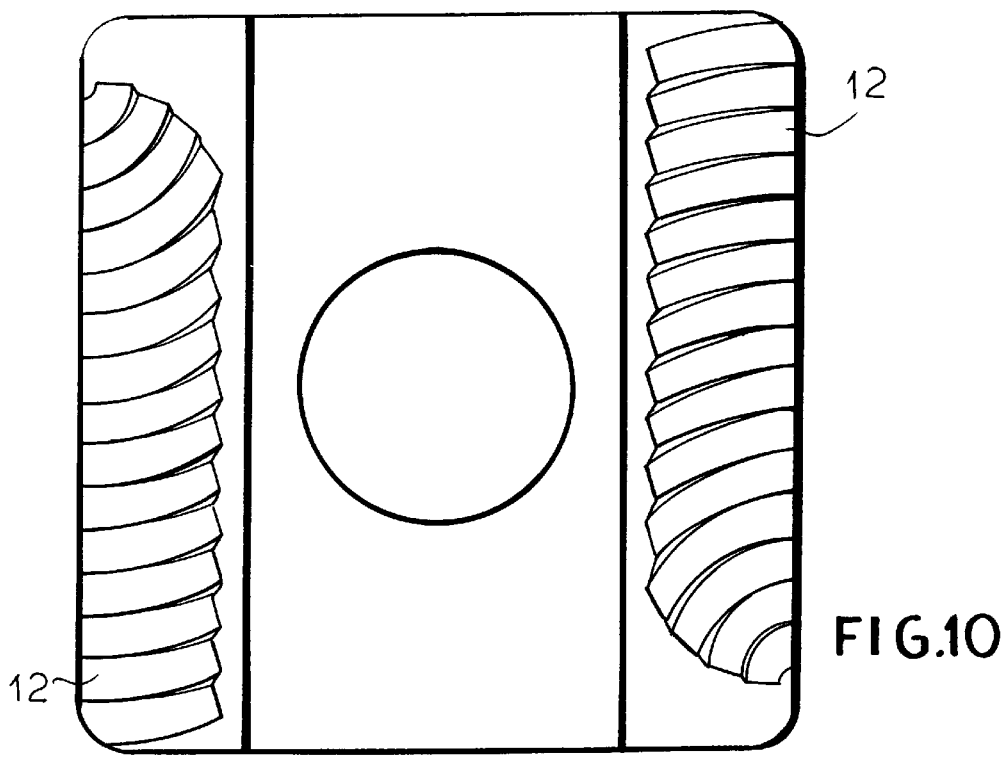
FIGS. 10, 11, and 12 are top views of cutting inserts intended for boring.
Figure 11:
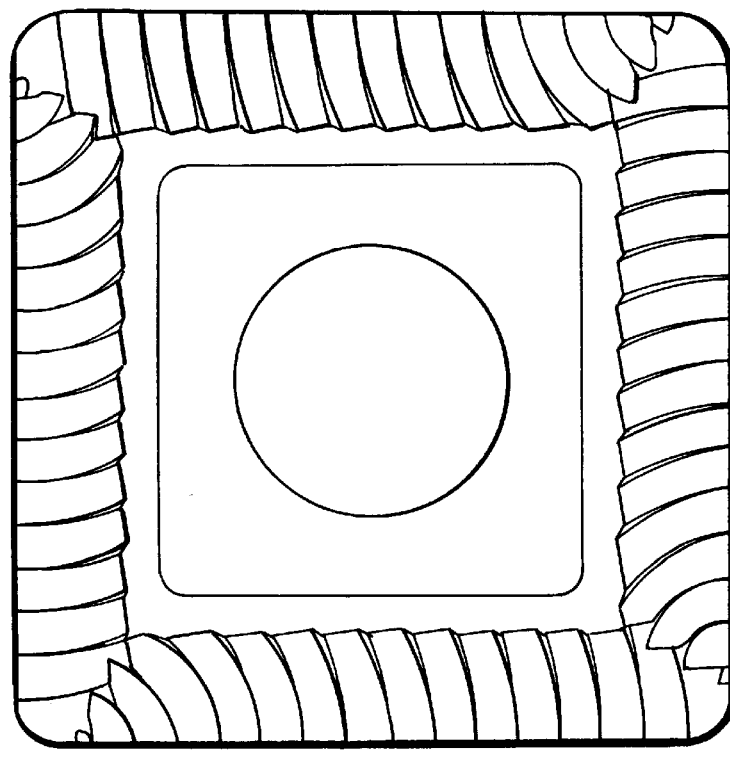

Such cutting inserts are shown for example in FIGS. 10 and 11. FIG. 10 shows a square cutting plate in a double-edged configuration, that is opposite sides have a scale-like microstructure. FIG. 11 shows a corresponding cutting plate in a four-edged embodiment wherein the scales extend in this embodiment to the cutting corners 35.

Figure 12:
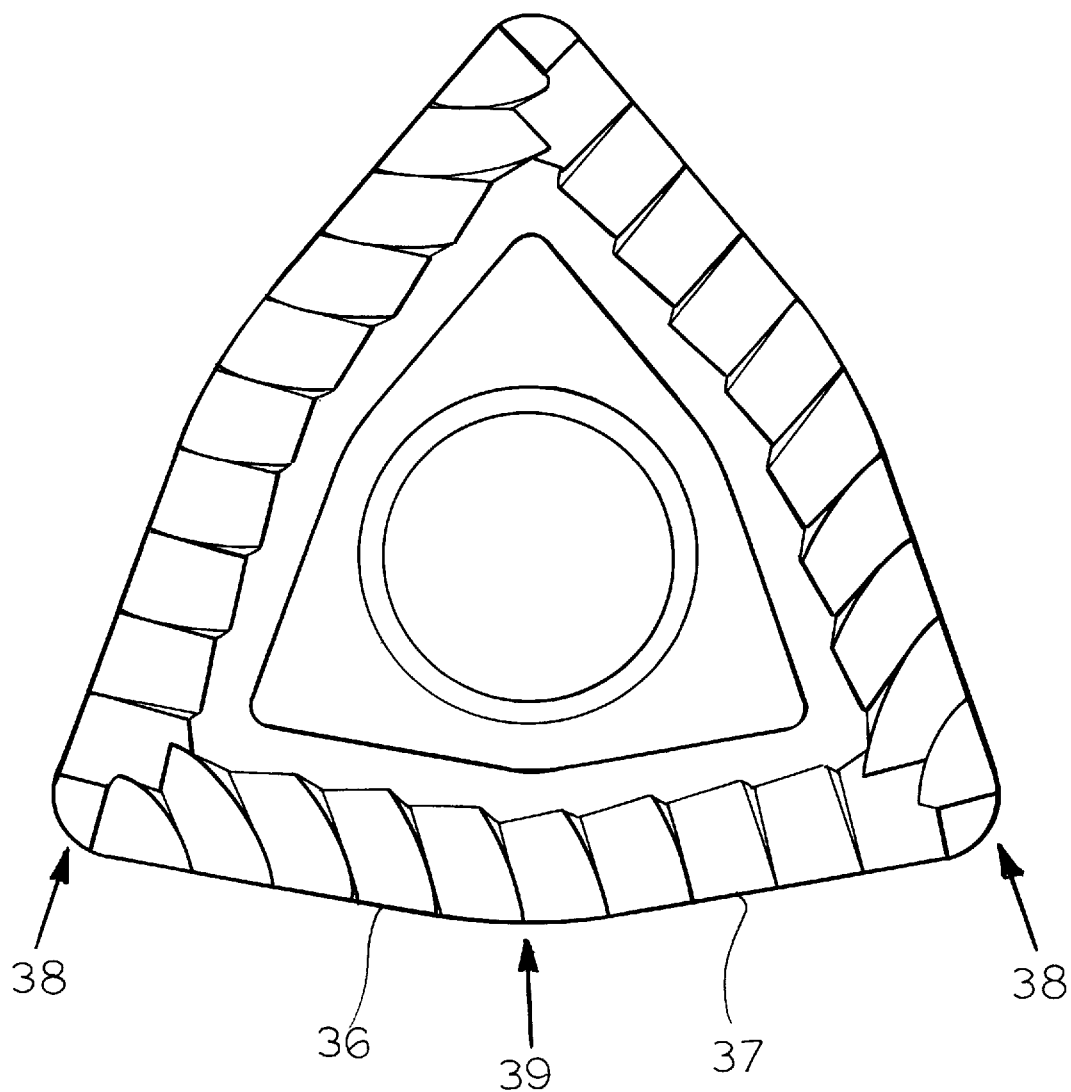

FIG. 12 shows a trigonal indexable cutting plate where during boring two cutting sections 36 and 37 of a cutting edge between adjacent acute cutting corners 38 are used. The resultant chip passes over the intervening obtuse cutting corner 39. With this embodiment the radii of curvature of the apex lines of the acute cutting corners 38 decrease to the adjacent acute cutting corner.

Figure 13:
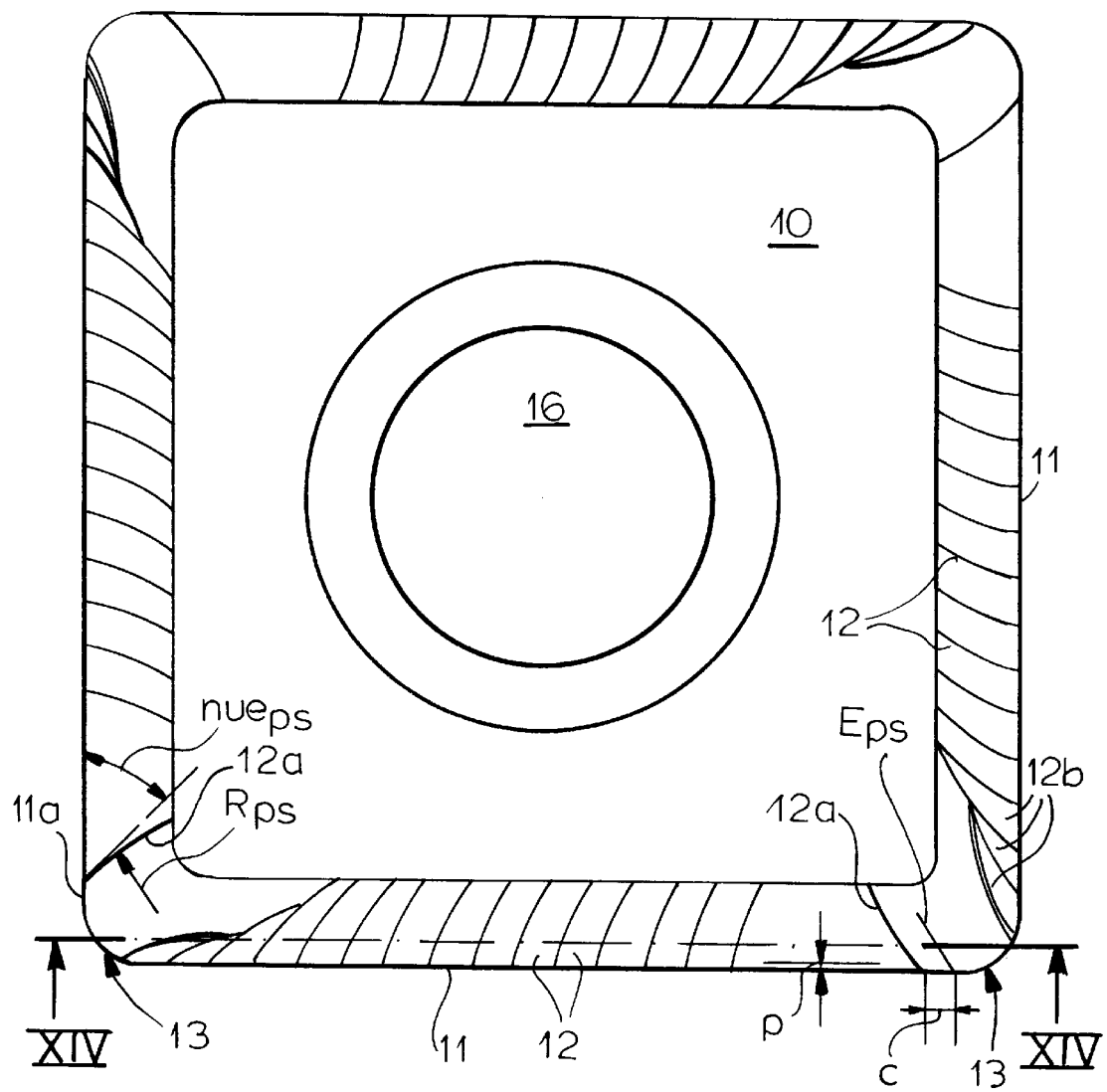
FIG. 13 is a top view of a milling tool according to the invention.

As can be seen in FIG. 13 the milling tool according to the invention, here shown as a square cutting plate, has on its cutting surface 10 along the (main) cutting edge 11 respective adjacent scales 12 which are elongated and which have longitudinal axes that are arranged at various angles from the effective cutting corner 13 to the cutting-edge center and beyond relative to the cutting edge. Relative to respective perpendiculars to the cutting edge the angles are greater close to the cutting edge corners and become smaller toward the cutting-edge center. The scales 12 are curved on their respective flanks seen from the cutting edge along their longitudinal direction with the curvature increasing away from the cutting edge or constant over the entire length. The cutting insert can be formed with or without a mounting hole 16.

With the thus formed right-cutting milling plate the curvatures are directed away from the cutting corner 13 along the main cutting edge 11.

In addition this milling plate has in the region of the planing edge 11a at least one further scale 12a with the same radius of curvature as the scales 12b on the main cutting edge. The curvature with a radius $R_{PS}$ of this scale 12a on the planing edge 11a is at least as large as the radius of curvature of the scales 12b on the cutting edge near the cutting corner. The angle $nue_{PS}$ on the scales 12a formed by a tangent to the scale direction relative to the cutting edges 11a is at least as large as the corresponding angle of the scales 12b below which these run relative to perpendiculars 11 to the main cutting edge. The planing edge 11a starts at point $E_{PS}$ where the cutting corner 13 which is defined by a corresponding corner radius ends and merges into the straight cutting edge 11a which extends away from the cutting corner at the cutting edge 11. The spacing of the point $E_{PS}$ from the point at which the scale 12a ends on the planing cutting edge 11a is shown at c. This spacing is between 0.03 mm and 4 mm. The scale 12a extends relative to the cutting edge 11a at a spacing d which lies in the range of 0.01 mm and 0.5 mm. In the present embodiment only one scale 12a is provided but there could also be two or more adjacent such scales of the same curvature.

Figure 14:
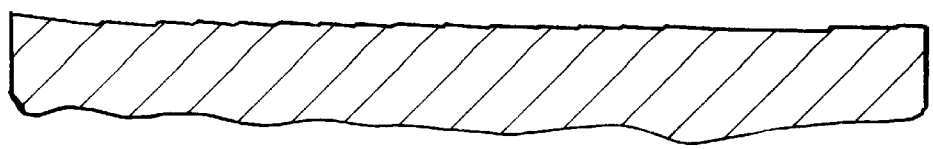
FIG. 14 is a section taken along line XIV—XIV of FIG. 13.

FIG. 14 is a section along line A—A of FIG. 13 which shows that the individual scales 12 (as well if necessary as the scales 12a) lie immediately adjacent one another.

We claim:
1. A cutting insert formed with:
   a cutting edge;
   structure forming a cutting corner at an end of the cutting edge;
   a cutting surface; and
   a row of raised scales extending along the cutting edge and each in turn formed with
      an arcuate apex line transverse to the cutting edge and forming at the cutting edge relative to a perpendicular to the cutting edge an angle between 55° and –5°,
      a steep flank to one side of the apex line, and
      a shallow flank to the other side of the apex line, the apex line being concave toward the other side.

2. The cutting insert defined in claim 1 wherein the other side is directed away from the cutting corner.

3. The cutting insert defined in claim 1 wherein the other side is directed toward a drilling center axis.

4. The cutting insert defined in claim 1 wherein the apex lines are of increasing radii of curvature away from the cutting corner.

5. The cutting insert defined in claim 1 wherein when used for drilling the apex lines are of decreasing radii of curvature from cutting corner to cutting corner.

6. The cutting insert defined in claim 1 wherein radii of curvature of the scales vary from between 0.1 mm and 12 mm at the cutting corner to between 2 mm and 60 mm at a center of the cutting edge.

7. The cutting insert defined in claim 1 wherein the scales have a height measured from the respective apex lines to bases of the respective flanks equal to between 0.01 mm and 0.25 mm.

8. The cutting insert defined in claim 1 wherein the scales have heights measured from the respective apex lines to bases of the respective flanks that increase away from the cutting corner.

9. The cutting insert defined in claim 1 wherein the apex lines extend at a cutting angle of –10° to +30°.

10. The cutting insert defined in claim 1 wherein the scales have measured perpendicular to the cutting edge predetermined lengths which increase away from the cutting corner.

11. The cutting insert defined in claim 10 wherein the lengths lie between 0.15 mm and 8 mm.

12. The cutting insert defined in claim 1 wherein the steep flanks are curved with a radius of curvature >0.1 mm and the shallow flanks are curved with a radius of curvature >1.5 mm.

13. The cutting insert defined in claim 1 wherein the steep flanks form with the cutting surface an angle of between 15° and 75° and the shallow flanks form a flatter angle smaller than 15°.

14. The cutting insert defined in claim 1 wherein the scales are rounded at the respective apex lines.

15. The cutting insert defined in claim 1, further comprising
   a chip-shaping scale at the corner generally symmetrical to a bisector of the corner and forming an angle open away from the corner of between 130° and 175°.

16. The cutting insert defined in claim 15 wherein the angle decreases away from the cutting corner.

17. The cutting insert defined in claim 1 wherein the scales extend to and end at the cutting edge.

18. The cutting insert defined in claim 1 wherein the insert is further formed with
   a substantially planar land between the scales and the cutting edge.

19. The cutting insert defined in claim 1 wherein there are between 3 and 30 scales along the cutting edge.

20. The cutting insert defined in claim 1 wherein the cutting insert is further formed with a second row of chip-shaping scales extending along the cutting edge, the first-mentioned row of scales being between the second row and the cutting edge.

21. The cutting insert defined in claim 1 wherein the flanks are substantially planar.

22. The cutting insert defined in claim 1 wherein the cutting insert is further formed with a side planing edge extending transversely to the cutting edge from the corner and constituting the structure forming the corner, and a further scale at the corner concave in the same direction as the scales along the cutting edge.

23. The cutting insert defined in claim 22 wherein the further scale has a larger radius of curvature than the scales along the cutting edge.

24. The cutting insert defined in claim 1 wherein the insert is polygonal.

25. The cutting insert defined in claim 1 wherein the cutting edge is straight.

* * * * *